July 28, 1959 A. LESTI 2,897,355
DIODE COINCIDENCE GATE
Original Filed May 15, 1948
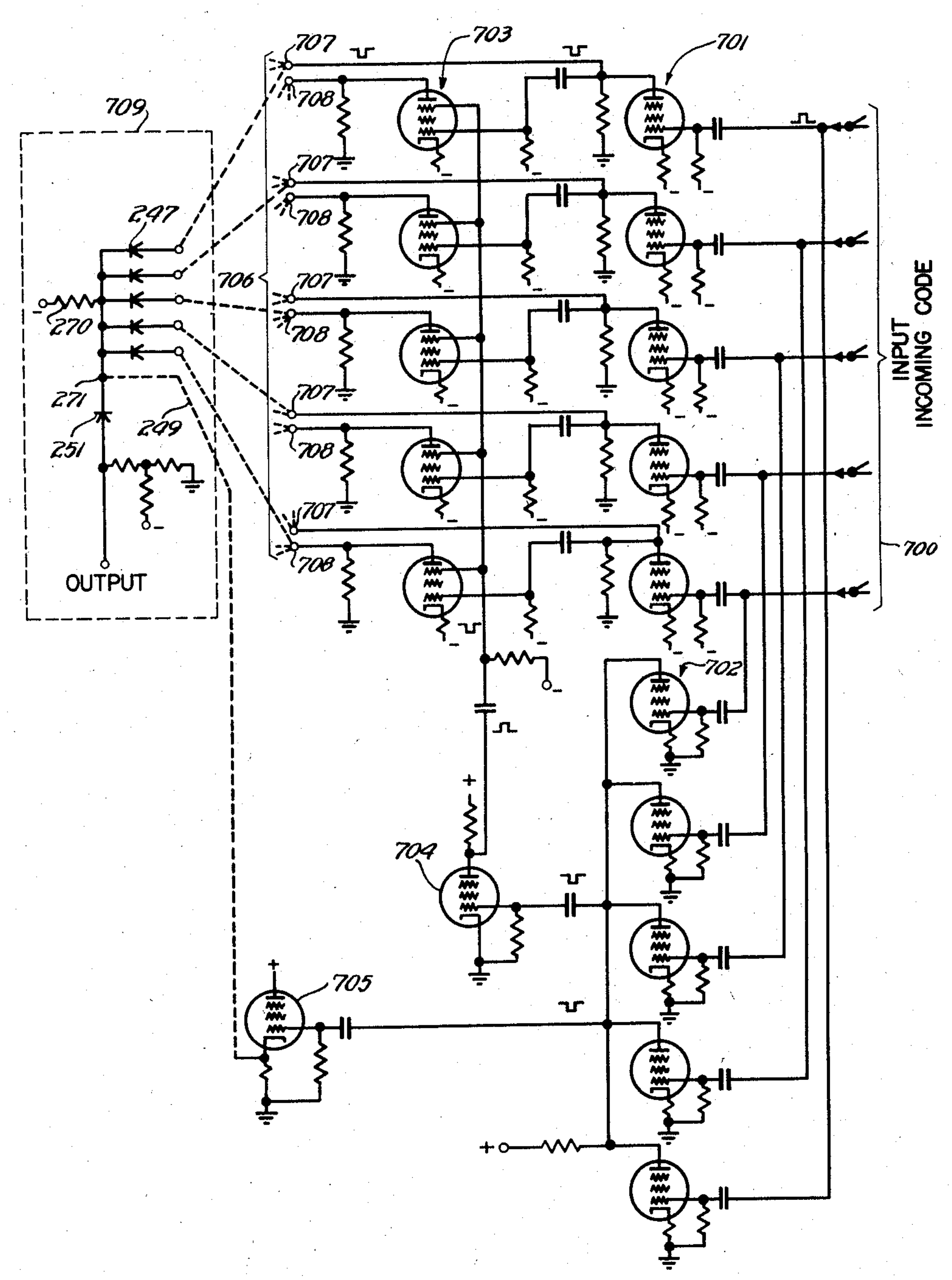
INVENTOR
ARNOLD LESTI
BY Robert Harding Jr.
ATTORNEY United States Patent Office
2,897,355
Patented July 28, 1959

2,897,355

DIODE COINCIDENCE GATE

Arnold Lesti, Arlington, Va., assignor to International Standard Electric Corporation, New York, N.Y., a corporation of Delaware Original application May 15, 1948, Serial No. 27,296, now Patent No. 2,619,548, dated November 25, 1952. Divided and this application August 23, 1952, Serial No. 305,973

4 Claims. (Cl. 250—27)

This invention relates to an improved all-electronic switching system, particularly adapted for telecommunication exchanges.

This application is a division of applicant's previous application which matured into U.S. Patent No. 2,619,548, issued November 6, 1952, and reliance thereon is made to complete the disclosure herein.

It has been the practice in the prior art to establish a connection between a calling and a called station, over a system of mechanical, electromechanical or electronic switches which operate in successive stages of selection to establish a private conductive pathway between the stations, and to keep each of the selectors thus employed, or a suitable substitute switch for each selector, fully engaged during the entire conversation. Mechanical and electromechanical switches, particularly when made to operate at high speed and when arranged to do almost continuous service day in and day out are subject to rapid wear and require systematic replacement and servicing. In addition, such equipment is relatively bulky and heavy and occupies much space. While electronic switches are not subject to the same objections, their installation and maintenance are expensive in all their previously suggested embodiments. Furthermore, prior electronic switching systems required either electronic devices specially designed for the purpose, or standard electronic devices but in great profusion for each station served.

It is an object of the present invention to devise a switching method and arrangement in which mechanical and electromechanical selectors may be completely avoided, and in which only a relatively small number of standard electronic devices are employed.

It is a further object of the present invention to arrange for the switching of a large number (of the order of ten or fifteen thousand) stations. Each station has only inexpensive individual equipment at the exchange to connect it to a common medium, e.g. a common metallic network. A number of private time channels, each allottable to a different call is available over the network to provide for the probable traffic. Each time channel is afforded by a pulse series seized from a train of frames of pulses. The selection for any one call is achieved over the common network by a coded set of simultaneously occurring pulses which is repeated in the time channel allotted to that call. Individual pulses of the coded set occur only on predetermined conductors, or buses of the network so as to constitute a code representing only the called station. The individual equipment employed to connect each station to the common network is simple and inexpensive, e.g. standard gas tubes and rectifiers, and is adapted to accept from the network only a call which is carried on particular reiterated sets of pulses which represent only that station and to accept it only if the station is idle.

It is a further object of the invention to devise electronic selecting arrangements operable in conjunction with various existing facilities. If, for example, a telephone exchange is to serve the customary subscribers' stations, then the selecting arrangement is made controllable by the standard dialing equipment provided at each station.

It is a further object of this invention that it obviate the need for so-called intermediate selectors or selection stages, and that the first and only selector suffice for handling any call in one or more central exchanges, even though they serve a large number of stations, i.e. of the order of ten or fifteen thousand or multiples thereof.

The important functions performed by the communication, e.g. telephone system here disclosed, are as follows:

Each station is connected with the exchange by a line which, at the exchange, terminates in equipment and circuits individual to that particular line. Said line as well as all other lines and circuits to be discussed, may be either metallic or established through any other medium, e.g. the air. The exchange has equipment common to all the lines and permanently associated with a common network. When a call is initiated at one of the stations its line will become effectively connected with the common equipment or some part thereof. This effective connection is established by means including instrumentalities producing and reiterating the code designation of the calling line. The calling line code is produced by the individual equipment of the calling line in a time channel which is permanently assigned to it. During this time channel and by modulating pulses produced in it, the calling station will dial the designation of the called station to the common equipment. The common equipment will control the impressing on the common network, in a different time channel temporarily allotted to the call thereon for the duration of the call, a reiterated set of pulses coded in accordance with the designation of the called station. The calling line code will also be impressed on the common network by the common equipment which at the same time transfers it to the temporarily alloted time channel from the time channel permanently assigned to the calling party. Each code, besides being useful for accomplishing a selection, serves as a carrier for speech signals. For selectively receiving calls each line is connected to an incoming circuit of the common network via individual equipment responsive only to the code which is assigned to that particular line. Therefore, the carrier pulses coded by the common equipment in response to dialing and applied by it to the common network will actuate only the individual equipment of the called line and signals will be transmitted on it only to the called line from the common network. These signals may be of any nature, for instance the pulses comprising the coded carrier may be amplitude modulated in accordance with the speech of the calling party.

The answering speech, or other answering signals are initially transmitted from the individual equipment of the called party as modulations of the coded carrier which it is receiving and these modulations are transferred under the control of means in the common equipment to the pulses coded in accordance with the designation of the calling station. The calling station's coded carrier is impressed on the common network from the output of said means. Thus, there is established a private two-way channel between the calling and the called stations via the common network.

Once it is effectively connected to a calling station and ready to receive dialing impulses, the common equipment sends dial tone to that station over its permanently assigned time channel, and in a case where the called station is already engaged, the common equipment modulates the coded carrier of the calling station with a busy signal tone whereby the calling station is informed of the busy condition of the called station.

System components will be described which fall into the following classes:

(1) Components individual to each station;

(2) Components common to groups of stations, but privately allotted to an individual station at the start of a call and so retained during the full period of conversation;

(3) Components common to groups of stations but privately allotted to an individual station at the start of a call to be engaged only transiently, for example during a period of time necessary to translate dialing impulses sent out by a calling party into a proper code for reaching the called party; and (4) Components common to a number of groups of stations, or to all the stations in the exchange, and which do not need to be allotted privately since they can serve a plurality of time channels.

To maximize common use of expensive circuits whenever possible, so-called line finders or any other time-channel seizing means are used for responding when a station is calling to connect with a common component and for disengaging the component to make it available for use by another calling station at the completion of the call, or even sooner if the component is not needed for the full duration of the communication, e.g. conversation. One common component which thus becomes engaged and disengaged is a component which serves to translate dialing impulses into a called code. While this form of the invention may be preferred and has certain obvious advantages, it would also be possible to employ individual code generating equipment for each station.

The so-called line finder is an electronic device adapted to seize the pulse series, i.e. the time channel, which is permanently assigned to a given station and which becomes available for seizure whenever that station is calling. Each station must have a separate time channel available for seizure by a line finder for the purpose of establishing a private channel from the calling station to a common component for generating a called code in response to dialing. However, the total number of stations will greatly exceed the number of time channels which can be made available by pulse multiplexing. Therefore the stations are divided into groups limited to perhaps 200. Accordingly, each line finder is not common to all of the stations in the exchange but only to one group and the number of line finders commoned to that group must be adequate to carry the probable traffic afforded by it.

Thus, a given station in one group may have on a first common network the same time channel that is allotted to another station in a different group having a separate first common network. The speech and/or signals carried on either first common network will not disturb the privacy of those carried on the other even if they are in the same time channel. After a station has dialed a number by sending impulses over its private channel on the first common network to actuate common code generating equipment for setting up a code on a second network common to a larger subdivision or even to the whole exchange, that code will be released in a free time channel on the second connection network which is not related to the time channel assigned to the calling station on the first common network. A called code set up on the second common network will be repeated at a supersonic rate in a free time channel that has been seized. The pulses which afford this time channel come from a common pulse generator providing enough channels for the probable peak traffic in the whole exchange via a pulse finder associated with the code generating equipment. Since the code is reiterated throughout the call, while the dialing of the called number is only a transient phenomenon, it is necessary not only that dialing be translated into a new form, i.e. coding, but that the resulting code be stored so that it will continue to be repeated until the end of the conversation. For this purpose, the code generating equipment employs for the called code a set of gas discharge tubes variably operated to set up and store the code which is transiently represented to it.

Modulation could be carried on separate accompanying pulses with either pulse-time, amplitude, or code modulation. In the embodiment shown herein, the modulation is carried simultaneously by the several series of synchronously recurring pulses which together comprise the reiterated coded pulse set. Before the modulation reaches the second common network, it leaves central exchange equipment individual to the calling station as amplitude modulation of the train of pulses (or "pulse series") affording the time channel permanently assigned to that station on the first common network. Since ordinarily the pulses in this train will be out of phase with the reiterations of the coded pulse set released onto the second common network, it would be difficult to effect a direct transfer of the modulation carried on the train of pulses to the reiterated coded set of pulses. Therefore, the modulation component is first detected, turning it back into a simple audio wave which is thereafter readily impressed on the reiterated coded pulse set without regard to its phase.

A number of basic components are disclosed in detail in said parent patent. These are combinable in the manner shown therein to form a complete exchange. A system for handling any number of subscribers may be produced simply by using appropriate numbers of each of the components and interrelating them in the manner shown.

The above-mentioned and other features and objects of the invention and the manner of attaining them will become more apparent and the invention itself will be best understood by reference to the following description of an embodiment of the invention taken in conjunction with the accompanying drawing in which:

The single sheet of drawing (corresponding to Fig. 7 of the drawing in said parent patent) is a circuit diagram of a common component, the decoder driver which receives a coded set of pulses from a set of main bus bars of the second network and processes them for application to the decoders of all the line circuits in a number of groups thereof, of all of the line circuits in the entire exchange, to the end that the code will operate a particular decoder to gate itself into the line circuit of the station which it designates. The decoder driver has as many inputs as there are elements in the code and a pair of outputs for each input, it being adapted to produce a pulse on one of the outputs of each pair when the code element received on the corresponding input is a pulse, and a pulse on the other when the code element received is the absence of a pulse.

Referring now to the drawing (which corresponds to Fig. 7 of the parent patent, as above mentioned), there is shown schematically the circuit of a decoder driver which is a common component and which transfers incoming called and calling codes from the second common network to many or all of the first common networks of the exchange over each of which they reach the decoders of all the line circuits served by it. In transferring the codes it translates them into a proper form for operating the decoders. The driver has a group of inputs, 700, each of which is fed from one bus of the set of main buses 135 (Fig. 1 of said parent patent) for incoming called codes. This set of buses receives called codes over a link from the set of main buses 132 for outgoing called codes. It receives calling codes over the same link and the same set of buses (132) since the calling codes are fed to the set of buses 132 after they leave the connector. To simplify the drawing this group of perhaps 14 inputs 700 is represented in the drawing herein by a group of only five. Each of the inputs 700 is connected to the control grid of one tube of each of two sets of vacuum tubes 701, 702. Each vacuum tube of the set 701 has its anode circuit connected to one of a first group of individual output terminals for the driver and also to the control grid of a corresponding tube of a third set of tubes 703. Thus, when one of the tubes 701 receives on its control grid a code element in the form of a reiterated positive pulse it will deliver a negative pulse series both to one of the individual output leads of said first group and also to the control grid of said corresponding tube of the set 703. Each of the tubes 702 normally has its control grid biased to cut off (not shown) and the plate circuits of all of these tubes are commoned. Therefore, when the driver receives reiterations of a code in a given time channel, whether the code includes many pulse elements or only one of this set of tubes will produce a single negative output pulse series in the same time channel. This single series is inverted in a tube 704 which applies the resulting positive pulse series to the suppressor grids of all the tubes 703. Each of the tubes 703 is normally cut off by a fixed negative bias on its suppressor grid. However, this is overcome in the time channel of any incoming code by the pulse series produced from it by the set of tubes 702 and the tube 704. Therefore, each of the tubes 703 which does not have a negative pulse series applied to its control grid in the same time channel from its associated tube 701 will produce a negative pulse series in that time channel. On the other hand any tube 703 which is receiving a negative pulse series in that time channel from its associated tube 701 will remain cut off. Each tube 703 has its anode circuit connected to one of a second group of individual outputs for the driver.

From the foregoing it is apparent that in the driver the form of the code is translated. On its input side there is a set of 14 conductors 700 of which receives codes having 14 elements on any one of which may have the form either of the presence of a pulse or of its absence. On its output side there are 14 pairs of conductors each pair comprising a conductor 707 and a conductor 708. The full set of 28 conductors (designated 706 in the drawing herein) carries translated codes each of which will consist of a reiterated full set of 14 simultaneously occurring pulses distributed over particular ones of the 28 conductors in accordance with the input code, and the output set will include 14 pulses no matter how many or how few pulse elements—even so few as one—the input code may have included before it was translated.

*Talking circuit through the driver*

All of the tubes of set 701, or of set 703, or of both sets, are adjusted to operate at saturation. Therefore, no modulation will be carried on the reiterations of a set of output pulses comprising a translated code. This is not essential but it is shown to illustrate how the modulations can be carried if in practice it should prove advantageous to actuate a decoder with a set of pulses of uniform amplitude. However, none of the tubes 702 operates at saturation and therefore each single pulse series produced by this set of tubes will carry the modulations previously carried by the input code occupying the same time channel, i.e. by the one or more synchronous pulse series comprising that input code. Each of these modulated single pulse series is amplified in a tube 705 from which it is applied in multiple to all of the line circuits in the exchange on the output sides of their decoders. The decoder of any line circuit engaged in a call will receive on its input side reiterated sets of fourteen simultaneously-occurring pulses representing its code and on its output side, and in the same time channel, a modulation-carrying single pulse series produced from its code by the set of tubes 702 of the driver. It will accept the sets of 14 pulses and convert them into a single (unmodulated) pulse series in the same time channel. Therefore, there will occur at the output of the decoder two synchronous single pulse series—one modulated and one not modulated. They are added together to produce a single pulse series whose pulses have a larger average amplitude and are modulated. This additive pulse series, as was explained above is eventually filtered and its audio components are sent to the station served by that line circuit.

In the first common network serving each group of line circuits there is a set of 29 buses shown in Fig. 1 of said parent patent as a single line 116. The driver's set of 28 code-carrying outputs 706 has its conductors individually connected to 28 buses of the set of 29 buses 116 of each first network. The output circuit of tube 705 is connected to the 29th bus of each set.

For any input code the driver will produce a full set of 14 output pulses reiterated on particular ones of the outputs 706 and over them on particular ones of the buses 116 (Fig. 1 of said parent patent). Therefore, in order that a decoder will respond only to its assigned code all that is necessary is that its 14 inputs be connected to particular ones of the set of buses 116, of the first network serving its line circuit, in accordance with that code.

Dotted block 709 contains an enlarged circuit diagram of a decoder (also shown in Fig. 4 of said parent patent). A negative potential is applied to circuit point 271 of the decoder over dropping resistor 270. Point 271 is grounded over 14 rectifiers 247, represented in the drawing herein by the group of five, each of which is connected to point 271 on its side offering low impedance to a negative voltage. Normally current will flow through the whole set of rectifiers over dropping resistor 270 thus greatly reducing the negative voltage applied to point 271. Even when the decoder is receiving sets of less than 14 pulses the same condition will continue to exist. However, when a full set of 14 negative pulses is applied to the decoder, one of them to each of the rectifiers 247, the opposition to the bias which they provide for the duration of a pulse will momentarily stop all current flow through 270 thus sharply increasing the negative potential at point 271 and producing a negative pulse. At the same time an amplitude modulated negative pulse series in the same time channel will be delivered to point 271 of this decoder from tube 705 over the 29th bus of the set 116 serving the line circuit including this decoder and over the input conductor 249 (Fig. 2 of said parent patent) of that line circuit.

A number of amplitude modulated single pulse series may be delivered from tube 705 to point 271 of this decoder, and to the corresponding point of every other decoder in the exchange but none of itself will be of sufficient amplitude to pass through negatively biased rectifier 251. However, in any line circuit engaged in a call one of the amplitude modulated pulse series which is received at 271 will be in synchronism with a full set of 14 pulses (its code) which will be actuating its set of rectifiers 247. Therefore, negative pulse series produced in response to its code will add to the modulated single pulse series and together they will pass through biased rectifier 251.

From what has been said above, it will be apparent to those skilled in the art that translation may be made of other types of code. While applicant has seen fit to describe the system in connection with a binary code system, it should be clearly understood that the invention contemplates the use of other code systems such as trinary, quaternary, etc.

While I have described above the principles of my invention in connection with specific apparatus, it is to be clearly understood that this description is made only by way of example and not as a limitation to the scope of my invention, as set forth in the objects thereof and in the accompanying claims.

I claim:

1. A decoder for accepting a distinctive code designation appearing on one or more of a set of $n$ conductors as one or more simultaneous voltages, comprising $n \times 2$ terminals, means for connecting each of said $n$ conductors with a separate pair of said $n \times 2$ terminals, said connecting means including means for producing a voltage on the first of said pair of $n \times 2$ terminals when a voltage appears on the associated $n$ conductor and means for producing a voltage on the second of said pair of $n \times 2$ terminals when no voltage appears on said associated $n$ conductor, a source of voltage, an output terminal, a dropping resistor connected between said source of voltage and said output terminal, $n$ connecting paths connecting said output terminal to a predetermined combination of $n$ of said $n \times 2$ terminals, said combination including one terminal of each of said pairs of $n \times 2$ terminals, and a unidirectional current-carrying device in each connecting path, so poled as to permit current to flow through said dropping resistor when the terminal to which said path is connected has no voltage thereon, whereby the voltage on said output terminal is raised to substantially the voltage of said source only when all the terminals connected thereto have a voltage thereon so as to block all the unidirectional current-carrying devices connected to said output terminal.

2. A decoder, as defined in claim 1, further comprising a unidirectional current-carrying device connected to the output terminal, means for biasing said device to prevent current from passing therethrough when said output terminal is substantially at the potential of the source, and means for applying a signal to said output terminal of sufficient value to overcome said biasing means.

3. A diode gating circuit for passing an applied input pulse when the input pulse coincides in time with a predetermined voltage level of a variable voltage level control signal, said gating circuit comprising an output terminal, an input terminal for receiving the applied input pulse, a control terminal for receiving the variable voltage level control signal, a diode connected between said input terminal and said output terminal, means connected with the juncture of said diode and output terminal for normally maintaining the voltage of said output terminal at such a value that current flow through said diode between said input and output terminals is prevented when an input pulse is applied to said input terminal, whereby no output pulse appears on said output terminal; and means connecting said control terminal with the juncture of said input terminal and said diode for altering the potential of said juncture when a control potential of said predetermined level is applied to said control terminal for causing current to pass through said diode when an input pulse is simultaneously applied to said input terminal, whereby an output pulse appears on said output terminal.

4. A decoder for accepting a plurality of voltage pulses and responding only when all of said pulses are simultaneously received, comprising an output channel, a first input circuit, a resistor connected between said first input circuit and said channel, a plurality of second input circuits connected to said channel, sources of voltage which produce variations of voltage in pulses between a maximum and a minimum value, means for connecting said sources to said second input circuits, means for maintaining a voltage on said first input circuit which is at least within the range of said voltage values produced by said sources, uni-directional current-carrying devices in said second input circuits and similarly poled so as to prevent current from flowing therethrough when the voltages applied to said second input circuits are at one of said values and to permit current to flow therethrough when said voltages are at the other of said values, a unidirectional current-carrying device connected to the output channel, means for biasing said device to prevent a signal from passing therethrough unless the voltage on said output channel is greater than it normally is at a time when current is prevented from flowing through all the second input circuits, and means for applying a signal voltage to said output channel so as to alter the voltage at such time sufficiently to overcome said biasing means and thus permit said signal voltage to pass through said device.

References Cited in the file of this patent

UNITED STATES PATENTS 2,502,443 Dunn et al. ............ April 4, 1950

FOREIGN PATENTS 344,444 Great Britain ............ Feb. 27, 1931